No. 795,647. PATENTED JULY 25, 1905.
A. REES.
WIRE TWISTER.
APPLICATION FILED MAY 24, 1904.
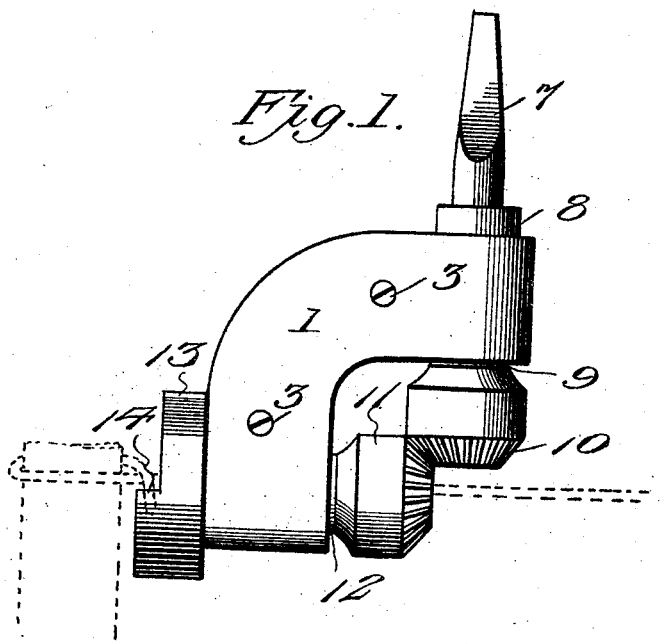
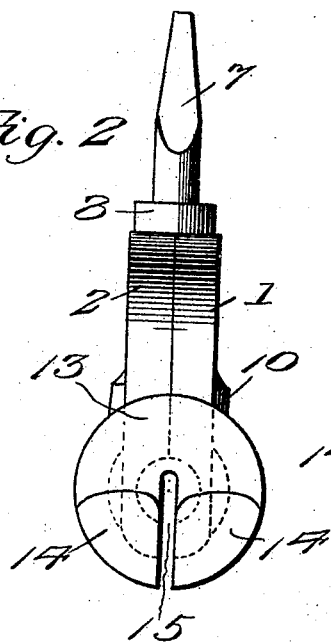
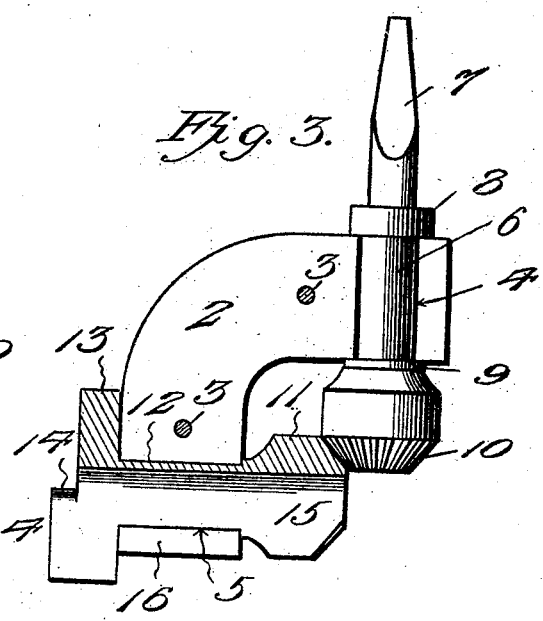
Witnesses
Wm. J. Booth.
Herbert D. Lawson.
Inventor
Abram Rees.
By Victor J. Evans
Attorney

UNITED STATES PATENT OFFICE.

ABRAM REES, OF BUNKERHILL, INDIANA.

WIRE-TWISTER.

No. 795,647. Specification of Letters Patent. Patented July 25, 1905.

Application filed May 24, 1904. Serial No. 209,509.

*To all whom it may concern:*

Be it known that I, ABRAM REES, a citizen of the United States, residing at Bunkerhill, in the county of Miami and State of Indiana, have invented new and useful Improvements in Wire-Twisters, of which the following is a specification.

My invention relates to new and useful improvements in means for twisting wires; and its object is to provide a compact and inexpensive device of this character which can be placed in an ordinary brace and readily applied to a wire or wires to be twisted.

A further object is to employ means which will quickly and efficiently twist the wires.

With the above and other objects in view the invention consists of a frame composed of clamping-plates which are arranged at opposite sides of and form bearings for shafts which are arranged at right angles to each other and which have gears at their adjoining ends which mesh so as to permit the transmission of motion from one shaft to the other. One of the shafts has a groove extending thereinto and through its gear, and this groove also extends through the disk which rotates with said shaft and has oppositely-disposed lugs thereon.

The invention also consists of the further novel construction and combination of parts hereinafter more fully described and claimed, and illustrated in the accompanying drawings, showing the preferred form of my invention, and in which—

Figure 1 is a side elevation of the device. Fig. 2 is an end elevation thereof; and Fig. 3 is a central vertical section, the drive-shaft being shown in elevation.

Referring to the figures by numerals of reference, 1 and 2 are similar curved plates adapted to be fastened together by means of screws 3 or any other suitable devices, and these plates have registering grooves 4 and 5 therein, in which are revolubly mounted shafts, which are disposed at right angles to each other. One of these shafts, 6, has a shank 7, extending therefrom and adapted to be engaged by an ordinary brace, (not shown,) and collars 8 and 9 are arranged on the shaft 6 for preventing longitudinal movement thereof. A gear 10 is located at one end of shaft 6 and meshes with a gear 11, which is arranged at one end of a shaft 12, revolubly mounted within the groove 5. A disk 13 is located at the outer end of the shaft 12, and this disk and gear 11 prevent longitudinal movement of said shaft. Lugs 14 are arranged upon the outer face of disk 13 adjacent the opposite sides thereof, and extending between these lugs and through the disk is a groove 15. Said groove also extends longitudinally within the shaft 12 and the gear 11 and is of sufficient width to permit the insertion of a wire thereinto.

When it is desired to twist a wire, the shank 7 is placed within a brace and the shafts 6 and 12 are rotated until the groove 15 registers with a slot 16, formed between the ends of the plates 1 and 2 adjacent the groove 5. The device is then slipped upon the wire to be twisted until said wire assumes the position shown by dotted lines in Fig. 1. The end of the wire is then looped and placed over one of the lugs 14 and the shaft 6 is rotated. Motion is transmitted through gears 10 and 11 to shaft 12, and disk 13 is therefore revolved, and the lugs 14 thereon twist the end of the wire or wrap it around the standing wire. This device is particularly adapted for use in securing wires to fence-posts and for connecting two wire strands. Should any of the parts become broken, they can be readily detached by removing the securing devices 3, so as to disconnect the plates 1 and 2.

In the foregoing description I have shown the preferred form of my invention, but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

A wire-twister comprising two companion plates of elbow form, said plates being connected intermediate of their ends to form terminal clamping portions, said terminal clamping portions being provided with bearing-openings disposed at right angles to each other, a shaft journaled in one of said bearing-openings and provided with collars engaging opposite sides of the bearing to hold it from longitudinal movement and having at one end a beveled gear and at the other end a shank adapted to be engaged by an ordinary brace, a second shaft arranged at an angle to the first-named shaft and journaled in the other bearing-opening, said second shaft being provided at one end with a beveled gear meshing with the gear on the first-named shaft and at its other end with a disk or head, said gear and disk or head being arranged at opposite ends of the bearing and forming stops to hold the shaft against endwise movement, the second shaft and its gear being provided with a longitudinal bore or passage, and the disk or head with a radial slot communicating with said bore and provided at one side of its center and on opposite sides of said slot with lugs, substantially as and for the purpose described.

In testimony whereof I affix my signature in presence of two witnesses.

ABRAM REES.

Witnesses:
WILLIAM ALLEN,
FRANK BETZNER.